(12) United States Patent
Pfeiffer et al.

(10) Patent No.: US 11,118,992 B2
(45) Date of Patent: Sep. 14, 2021

(54) PRESSURE SENSOR ASSEMBLIES WITH PROTECTIVE PRESSURE FEATURE

(71) Applicants: TE Connectivity Solutions GmbH, Steinach (CH); Measurement Specialties, Inc., Hampton, VA (US)

(72) Inventors: Martin Pfeiffer, Neuchâtel (CH); Predrag Drljaca, Neuchâtel (CH); Jean-Francois Le Néal, Neuchâtel (CH); David Eric Wagner, Los Gatos, CA (US); Schahrazède Mouaziz, Boudry (CH)

(73) Assignees: MEASUREMENT SPECIALTIES, INC., Hampton, VA (US); TE CONNECTIVITY SOLUTIONS GMBH, Steinach (CH)

(*) Notice: Subject to any disclaimer, the term of this patent is extended or adjusted under 35 U.S.C. 154(b) by 314 days.

(21) Appl. No.: 16/434,153

(22) Filed: Jun. 6, 2019

(65) Prior Publication Data
US 2020/0386645 A1 Dec. 10, 2020

(51) Int. Cl.
*G01L 19/06* (2006.01)
(52) U.S. Cl.
CPC ...... *G01L 19/0609* (2013.01); *G01L 19/0618* (2013.01)
(58) Field of Classification Search
CPC ..... G01L 9/0042; G01L 19/04; G01L 9/0054; G01L 9/0072; G01L 13/025; G01L 19/14; G01L 19/0038; G01L 19/0084; G01L 9/0055; G01L 9/0075; G01L 19/0069; G01L 9/0052; G01L 9/0073;

(Continued)

(56) References Cited

U.S. PATENT DOCUMENTS 2,804,093 A * 8/1957 Scherer ............... G01L 19/0609
138/26
3,540,285 A * 11/1970 Nicolau ............... G01L 19/0645
73/706

(Continued)

FOREIGN PATENT DOCUMENTS

DE  102018126177 A1  4/2019

OTHER PUBLICATIONS

Extended European Search Report, European Application No. 20177644.0-1001, European Filing Date, Oct. 16, 2020.

*Primary Examiner* — Andre J Allen (57) ABSTRACT

Pressure sensor assemblies comprise a sensor body having a membrane within the body for placement in communication with a fluid from an external source and determining a pressure of the fluid. A support is connected with the body and includes a channel extending therethrough for receiving the fluid, wherein the channel is in fluid-flow communication with the membrane. A substrate is connected with the support and comprises a channel extending therethrough for receiving the fluid from an external source. The support may be formed from a material having a coefficient of thermal expansion that is between a coefficient of thermal expansion of the support and a coefficient of thermal expansion of the external fluid source connected with the substrate. One of the substrate or the support comprises a fluid pressure mitigation feature for mitigating the transmission of a pressure spike in the fluid to protect the sensor membrane.

20 Claims, 5 Drawing Sheets

(58) Field of Classification Search
CPC ............ G01L 19/0092; G01L 19/0618; G01L 19/0645; G01L 19/143; G01L 9/0051; G01L 19/0007; G01L 19/0046; G01L 19/06; G01L 19/0627; G01L 19/0681; G01L 27/002; G01L 9/00; G01L 9/0041; G01L 9/0044; G01L 11/025; G01L 11/04; G01L 19/0023; G01L 19/0672; G01L 19/069; G01L 19/142; G01L 19/145; G01L 19/16; G01L 7/00; G01L 9/0047; G01L 9/06; G01L 9/065; G01L 9/12; G01L 11/02; G01L 13/00; G01L 15/00; G01L 19/0015; G01L 19/003; G01L 19/02; G01L 19/0609; G01L 19/083; G01L 19/10; G01L 19/148; G01L 27/005; G01L 7/08; G01L 7/082; G01L 7/163; G01L 7/166; G01L 9/0045; G01L 9/0048; G01L 9/006; G01L 9/007; G01L 9/0076; G01L 9/04; G01L 9/045; G01L 9/125; G01L 11/00; G01L 17/00; G01L 19/00; G01L 19/0076; G01L 19/08; G01L 19/141; G01L 19/146; G01L 1/142; G01L 1/2262; G01L 1/246; G01L 21/12; G01L 23/16; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/08; G01L 9/085; G01L 9/105; G01L 9/14; G01L 9/16

USPC .................................................... 73/700–756
See application file for complete search history.

(56) References Cited

U.S. PATENT DOCUMENTS

| | | | |
|---|---|---|---|
| 5,062,302 A * | 11/1991 | Petersen | ............ G01L 19/0618 73/754 |
| 6,886,929 B2 | 5/2005 | Malik et al. | |
| 9,212,054 B1 | 12/2015 | Kwa | |
| 2005/0139009 A1 | 6/2005 | Flogel et al. | |
| 2012/0090531 A1 | 4/2012 | Angus et al. | |
| 2013/0263671 A1 * | 10/2013 | Wagner | ............... G01L 19/0609 73/707 |
| 2017/0089792 A1 | 3/2017 | Russell et al. | |
| 2019/0353549 A1 * | 11/2019 | Choi | ..................... G01L 19/143 |
| 2020/0191313 A1 * | 6/2020 | Lindahl | ................ F16L 55/045 |
| 2020/0386641 A1 * | 12/2020 | Pfeiffer | ............... G01L 19/0038 |

* cited by examiner

PRESSURE SENSOR ASSEMBLIES WITH PROTECTIVE PRESSURE FEATURE

FIELD

Pressure sensor assemblies as disclosed herein relate to pressure sensors comprising a sensor membrane or diaphragm in communication with a gas or fluid from an external source being monitored and, more specifically, pressure sensors that provide an improved degree of protection against damage caused by transient fluid pressure events such as high-pressure spiking and the like.

BACKGROUND

The use of pressure sensor assemblies or pressure sensors are known in the art for measuring or monitoring the pressure of fluid from an external source that the pressure sensor is in fluid flow connection with. Conventional pressure sensor assemblies comprise a diaphragm or a membrane that is placed in contact with the fluid, and that is configured having a thin-wall construction for purposes of converting pressure in the fluid to stress or displacement in the diaphragm as fluid pressure is imposed thereon. Typically, such pressure sensors have a port or opening for receiving the fluid from the external source, wherein the fluid is transferred within the pressure sensor to the diaphragm or membrane, and wherein one or more detecting elements may be connected with the diaphragm to measure or take data/receive signals regarding diaphragm movement to thereby determine the fluid pressure.

A problem with such conventional pressure sensors is that the fluid being measured may come from an external source capable of generating transient events of high pressure, e.g., pressure spikes, that when transmitted to the pressure diaphragm or membrane may be outside the design pressures and thereby cause damage to the pressure diaphragm or membrane, i.e., could cause the diaphragm or membrane to flex beyond its designed yield point, and permanently damage the pressure sensor.

In view of such issue, accessory devices referred to in the art as snubber devices have been developed and are constructed as ancillary devices for placement between the external fluid source and the pressure sensor. Such snubber devices are in the form of diaphragms, small orifices or restrictors, or free-moving tubing and operate to mitigate the shock wave of a transient fluid pressure event to reduce or mitigate the shock wave before entering the pressure sensor. However, such ancillary snubber devices add to the overall packaging cost and size of the pressure sensor, as they are external devices, and may not be suited for end-use applications where space for fitment of the installed pressure sensor is at a premium, e.g., such as when used with an engine or powertrain member of a vehicle.

It is, therefore, desired that pressure sensor assemblies be constructed in a manner that provides a desired level of protection against damage from transient fluid pressure transient events, e.g., pressure spikes. It is further desired that such pressure sensor assemblies be constructed in a manner that provides such protection without adding to the overall size of the pressure sensor assembly for packing and placement purposes, and that avoids the need for the above-noted external snubber devices or other external devices. It is still further desired that such pressure sensor assemblies be constructed in a manner mitigating a difference in the coefficient of thermal expansion properties that exist between the sensor and an external device that the sensor is connected with, e.g., the device transferring the external fluid for pressure sensing.

SUMMARY

Pressure sensor assemblies as disclosed herein generally comprise a sensor body comprising a sensing membrane disposed within the body for placing a fluid from an external source in communication with the membrane and determining a pressure of the fluid. The sensor assembly further comprises a support connected with the body and comprising a channel extending therethrough for receiving the fluid, wherein the channel is in fluid-flow communication with the membrane. A substrate is connected with the support and comprises a channel extending therethrough for receiving the fluid from an external source, wherein the fluid is transmitted through the substrate to the support. In an example, the support is formed from a material having a coefficient of thermal expansion that is between a coefficient of thermal expansion of the support and a coefficient of thermal expansion of the external fluid source connected with the substrate. In an example, the sensor body is formed from silicon and the substrate is formed from a ceramic material. One of the substrate or the support channels comprises a pressure mitigation element or feature for mitigating the transmission of pressure spikes in a gas or fluid from the external source to the sensor membrane. In an example, the substrate comprises a number of ceramic elements that are bonded together to form the pressure mitigation feature. In an example, the pressure mitigation feature comprises an enlarged volume section. In an example, the pressure mitigation feature comprises a movable member disposed within the channel. In an example, the pressure mitigation feature comprises a porous member disposed within the channel. In an example, the pressure mitigation feature comprises two or more changes of direction of the channel as it moves through the support or substrate. In an example, the pressure sensor assembly may further comprise a printed circuit board connected with the substrate.

A method for mitigating a pressure spike of an external fluid being monitored by a pressure sensor assembly as disclosed herein may comprise directing the fluid from an external source into a substrate having a channel extending therethrough. The fluid is then transferred from the substrate to the sensor body, wherein the fluid enters the sensor body and comes into contact with the membrane. In an example, a support is interposed between the sensor body and the substrate. A high pressure spike in the fluid is mitigated within the pressure sensor assembly by directing the fluid through the pressure mitigation feature that is internal to the pressure assembly and positioned upstream from the sensor body membrane.

BRIEF DESCRIPTION OF THE DRAWINGS

Pressure sensor assemblies as disclosed herein will now be described by way of example with reference to the accompanying Figures, of which.

DETAILED DESCRIPTION

Embodiments of pressure sensor assemblies will be described hereinafter in detail with reference to the attached drawings, wherein like reference numerals refer to the like elements. Pressure sensor assemblies or pressure sensors as disclosed herein may, however, be embodied in many different forms and should not be construed as being limited to the embodiments set forth herein; rather, these embodiments are provided so that the disclosure will be thorough and complete, and will fully convey the concept of pressure sensor assemblies to those skilled in the art.

Pressure sensor assemblies or pressure sensors as disclosed herein generally comprise a sensor body connected with a support and a substrate, wherein one or more of the sensor assembly support or substrate is specially engineered to include an integral pressure mitigation element or feature in the form of a channel or the like that is configured to mitigate a shock wave resulting from a transient gas or fluid pressure event of a fluid that enters the pressure sensor for pressure measurement/monitoring. In an example, pressure sensors as disclosed herein are configured in the form of micro-electrical mechanical systems (MEMS) pressure sensors for monitoring or measuring the pressure of a fluid of an external device, and sending a pressure signal to a remote device such as a controller, processor or the like. A feature of pressure sensors as disclosed herein is that they are constructed comprising a built-in/integral fluid shock mitigation feature, thereby obviating the need to use external snubbers or the like and avoiding the above-noted deficiencies associated therewith. It is to be understood that pressure sensor assemblies as disclosed herein may be used in gas or fluid service. A further feature of such assemblies is that they may be constructed in a manner that helps to protect against damage that may be caused by particles present in the fluid that can otherwise directly access the membrane.

Figure 1:
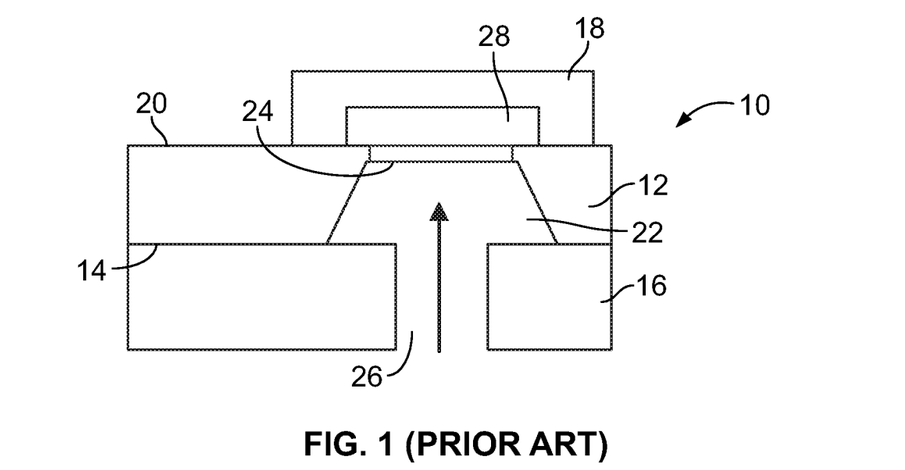
FIG. 1 is a cross-sectional side view of a prior art pressure sensor assembly.

FIG. 1 illustrates a prior art MEMS pressure sensor 10 comprising a silicon sensor body 12 that is attached or otherwise bonded by conventional method along a bottom surface 14 to a glass support 16. The support 16 is configured to facilitate attachment of the pressure sensor to an external fluid source to be monitored or measured through the use of a further assembly or housing (not shown) configured to promote such interposed attachment. This example includes a top cover 18 that is formed from glass and that is attached or otherwise bonded by conventional method to an upper surface 20 of the sensor body 12. The sensor body includes an internal chamber 22 and a membrane or diaphragm 24 disposed along one end of the internal chamber and that is configured to move in response to fluid pressure imposed thereon.

Fluid from an external source enters the pressure sensor 10 through a constant diameter opening 26 that passes through the support 16 and that provides continuous unobscured fluid-flow communication with the sensor body internal chamber 22. As the pressure of the fluid entering the pressure sensor changes, this causes the membrane or diaphragm 24 to be moved. The top cover 18 includes a chamber 28 that provides a known reference volume, wherein movement of the diaphragm or membrane resulting from fluid pressure changes cause changes in the reference volume which changes are monitored and measured for purposes of determining therefrom the fluid volume pressure. Such pressure sensors comprise electrical pressure sensing elements, such as piezo resistive elements or the like, that may be connected with the membrane or with other portions of the sensor for purposes of providing an output signal in response to a change in a property of the sensor in response to fluid pressure.

Such prior art MEMS pressure sensors as illustrated in FIG. 1 comprise sensing diaphragms or membranes that are designed to operate within defined fluid pressure conditions and yield conditions of the diaphragm or membrane. If the fluid pressure that the pressure sensor is subjected to is outside of the defined conditions, such as during a transient fluid high-pressure event or spike, this could cause the diaphragm or membrane to tear or otherwise be damaged, which would render the pressure sensor unusable. In such prior art pressure sensor 10 the fluid entering the pressure sensor is passed directly through the support opening 26, into the pressure sensor internal chamber 22, and into contact with the diaphragm or membrane 24. While there is a slight increase in volume moving from the substrate opening to the sensor body internal chamber, such volume change is not sufficient to mitigate or offset the shock effect on the diaphragm from such a transient fluid high-pressure spike. As noted briefly above, in an effort to address such limitation of prior art pressure sensors, external snubber devices as have been used, wherein such snubber device is interposed between the external fluid source and the MEMS pressure sensor.

Figure 2:
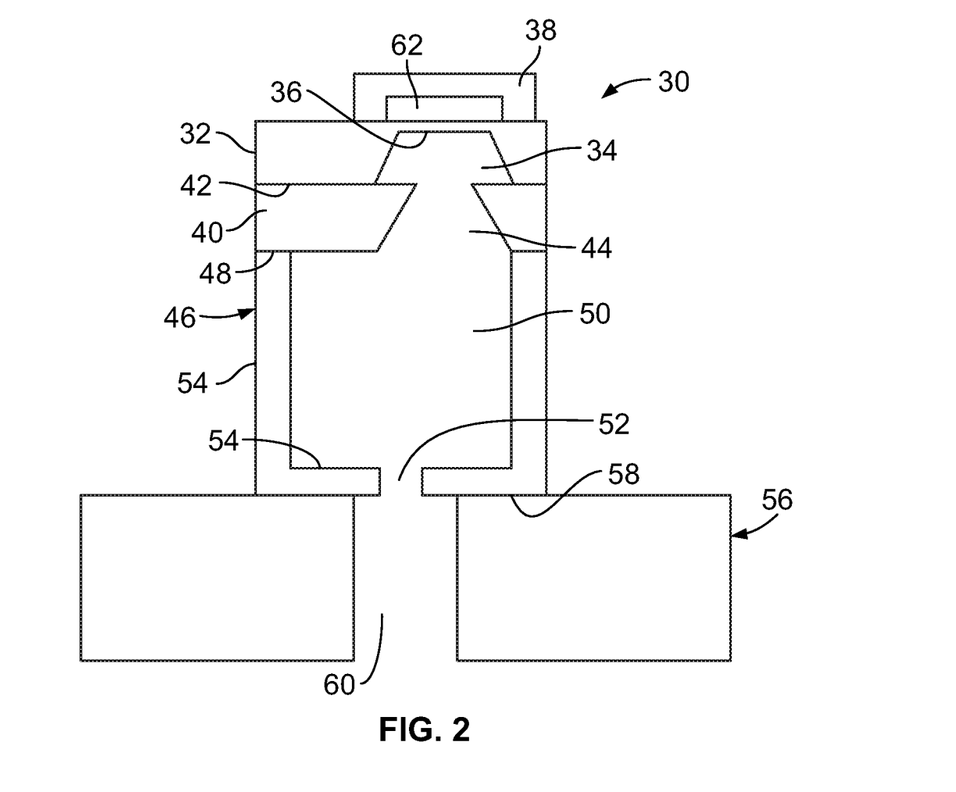
FIG. 2 is a cross-sectional side view of an example pressure sensor assembly as disclosed herein.

FIG. 2 illustrates an example pressure sensor assembly 30 as disclosed herein. In an example, the pressure sensor is an MEMS sensor comprising a sensor body 32 having an internal cavity 34 with a membrane 36 at one end of the cavity, wherein the cavity has a conical shape that is tapered outwardly moving from the membrane to the cavity opening. A top cover or upper support 38 is disposed over the sensor body 32 and is positioned to cover the membrane 36. A support 40 is connected to an underside surface 42 of the sensor body 32 and includes an opening or cavity 44 extending therethrough having a conical outwardly tapered configuration moving away from the sensor body. The support opening is aligned with the sensor body cavity 34 so as to facilitate fluid transport therebetween. A first substrate 46 is attached to an underside surface 48 of the support 40 and includes an enlarged volume chamber 50 extending from the first support to an inlet port 52 opposite the support. The first substrate 46 includes a sidewall 54 that is attached to and extends from the support along an outer perimeter of the support underside surface 48, wherein the enlarged volume chamber is defined within the substrate sidewall. The inlet port 52 is disposed through a substrate base section 54 that connects with the substrate sidewall. A second substrate 56 is attached to an underside surface 58 of the first substrate 46 and includes a passage 60 extending therethrough that is in alignment with the first substrate inlet port 52. In an example, the first substrate inlet port 52 is sized having a reduced diameter relative to the second substrate passage 60. The overall construction of the pressure sensor assembly of this example is configured to facilitate the passage of a fluid therein through the second substrate to the sensor body. The features of the reduced diameter first substrate inlet port 52 and the first substrate enlarged volume chamber 50 operate together to mitigate the effect of a pressure fluid spike entering the sensor assembly and being passed to the sensor body membrane 36.

In an example, the sensor body may be formed from silicon and be provided as a silicon wafer, e.g., in the form of single-crystalline silicon or other suitable silicon. The support 40 may be formed from materials having a coefficient of thermal expansion that is similar to the material used to form the sensor body. In an example, the support may be selected from the group including silicon or other materials, such as glass or PYREX, which are chemically inert and can be bonded to the sensor body. In an example, the support 40 is formed from glass. The pressure sensor top cover or upper support 38 is optional and may be formed from the same types of materials as the support 40 described above and is attached or bonded to the sensor body. The upper support 38 includes an internal chamber 62 that is configured to provide a reference volume. The opening in the support 40 may be formed by conventional methods such as machining, etching, molding or the like.

A feature of this example pressure sensor assembly 30 is that the fluid pressure spike mitigation feature is an integral part of the assembly formed by machining process, etch process, deposition process, and the like. The first and second substrates 46 and 56 may be attached to the sensor body and support by conventional techniques such as by suitable adhesive material, glass frit and the like. The first and second substrates may be formed from the same or different materials. In an example, the first and/or second substrates may be formed from materials that have a coefficient of thermal expansion that is between that of the support and an external device that the second substrate is attached to for providing the external fluid, thereby acting to provide a transition in the thermal expansion characteristics between the support and such external device so as to reduce or eliminate thermal expansion mismatches that may cause damage to the sensor assembly during operation. In an example, the first and/or second substrates may be formed from the same or different materials that may include glass or ceramic materials. In an example, the second substrate is formed from a ceramic material such as aluminum oxide ($Al_2O_3$). While a particular type of ceramic material has been disclosed, it is to be understood that other types of ceramic materials may be used that provide the desired thermal expansion transition feature noted above.

Figure 3:
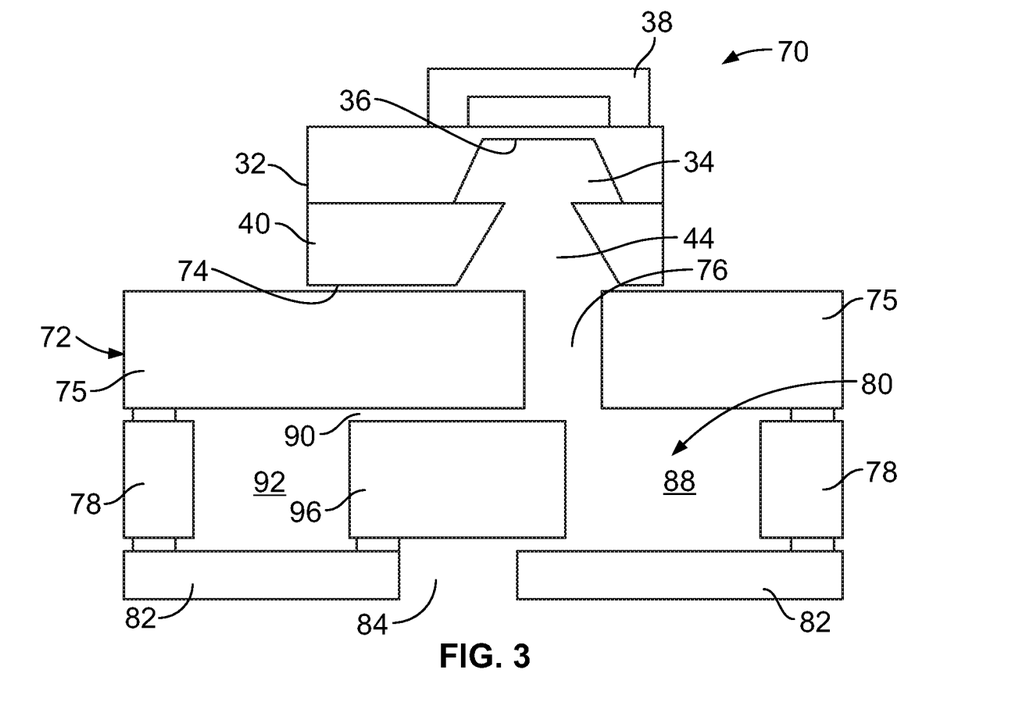
FIG. 3 is a cross-sectional side view of an example pressure sensor assembly as disclosed herein.

FIG. 3 illustrates an example pressure sensor assembly 70 as disclosed herein having a sensor body 32 with an internal cavity 34 and membrane 36, a top cover or support 38, and a support 40 similar to that described above and illustrated in FIG. 2. In this example, a substrate 72 is attached with an underside surface 74 of the support 40 and is formed from a number of substrate members. In this example, a first substrate member 75 is attached to the support and includes a passage 76 therethrough that is aligned and in fluid flow communication with an opening 44 in the support. A substrate wall member 78 is attached to an underside portion of the first substrate member 75 along an outer perimeter thereby defining an internal chamber 80 within such substrate wall member 78. A substrate base member 82 is attached to an underside portion of the substrate wall member 78, and includes an inlet opening 84 extending therethrough. A substrate center member 96 is attached to the substrate base member 82 at one side of the inlet opening 84 and is positioned over the opening to divert fluid entering the substrate 72 through the inlet opening 84 into a first chamber cavity 88 positioned on one side of the substrate center member 96. As illustrated in FIG. 3, fluid within the first chamber cavity 88 may pass through a horizontal passage 90 defined between the substrate center member 96 and the first substrate member 75 and into a second chamber cavity 92. The substrate center member is 96 is positioned to partially obstruct the passage 76 through the first substrate member 75 so that in the event of a high-pressure spike condition the fluid entering the substrate may be mitigated by the enlarged volume provided by one or both of the first and second chamber cavities, in addition to the changes in fluid path direction provided by the combined positioning of the substrate base member inlet opening 84 relative to the first substrate passage 76 as combined with the placement position of the substrate center member 96 therebetween.

In this example, the different substrate members forming the substrate 72 may be joined together in the manner described above, e.g., by adhesive bonding, glass frit or the like. In an example, the substrate members are joined together by screen printing glass to the substrates prior to assembly, and then assembling the substrate members and subjecting the assembly to an elevated temperature useful for bonding the substrate members together. In an example, the different substrate members may all be formed from the same type of material as described above or may be formed from materials having different thermal expansion characteristics for purposes of providing the desired thermal expansion buffering and transition function as between the support and an external fluid providing device attached to the substrate.

Figure 4:
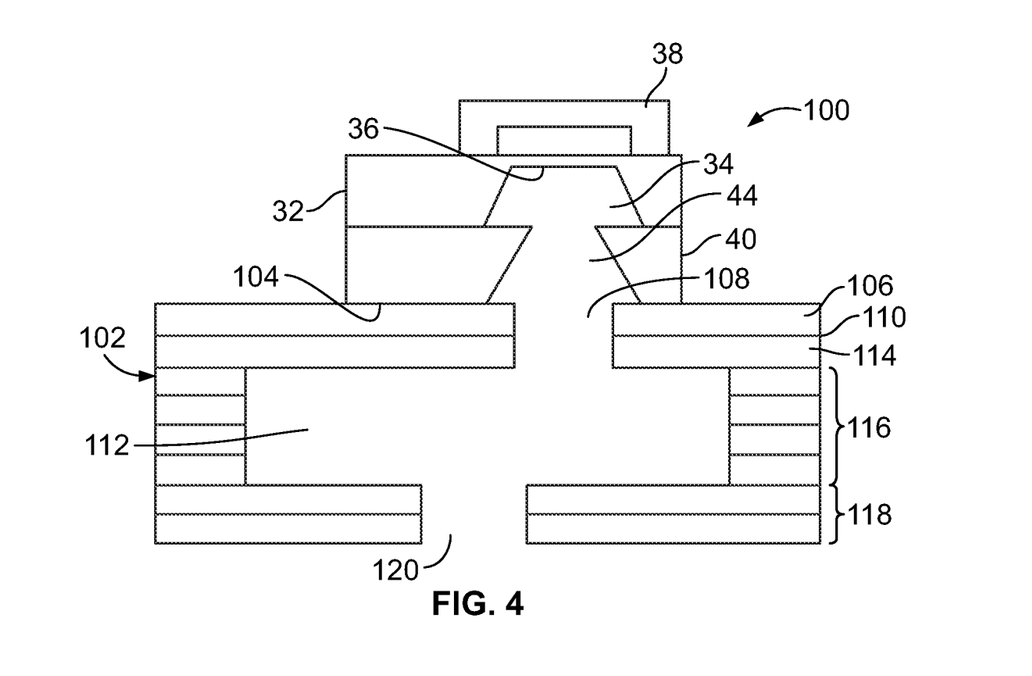
FIG. 4 is a cross-sectional side view of an example pressure sensor assembly as disclosed herein.

FIG. 4 illustrates an example pressure sensor assembly 100 as disclosed herein having a sensor body 32 with an internal cavity 34 and membrane 36, a top cover or support 38, and a support 40 similar to that described above and illustrated in FIG. 2. In this example, a substrate 102 is attached with an underside surface 104 of the support 40. Unlike the example described above and illustrated in FIG. 3, the substrate 102 of this example is one provided in the form of a laminate construction of multiple substrate layers. In an example, the substrate 102 may be provided in the form of a multilayer ceramic material such as LTCC or HTCC that is formed during a sintering process. The different layers may be configured so as to provide the desired pressure spike mitigation feature. In this example, a first layer 106 is configured to attach with the support 40 and has an opening 108 therethrough that is in fluid flow communication with the support opening 44. The first layer extends outwardly to provide an outer wall 110 that permits formation of an enlarged volume cavity or chamber 112 within the support. A second layer 114 is bonded to an underside surface of the first layer 106 and is configured identically. A number of substrate side wall layers 116 are configured having an outer dimension that is the same as layers 106 and 114, and have a reduced wall thickness for the purpose of forming the chamber 112 that extends radially outwardly from the opening 108. Substrate base layers 118 are attached to the last of the substrate wall layers 116 and extend inwardly to define the chamber and form an inlet opening 120 of the substrate 102. Configured in this manner, the multi-layer substrate construction operates to provide a pressure spike mitigation feature through the enlarged volume chamber 112 formed therein and positioned between the substrate inlet opening 120 and the substrate opening 108. In an example, the substrate inlet opening 120 and substrate opening 108 are also axially offset from one another, also operating to provide a degree of fluid pressure spike mitigation.

Figure 5:
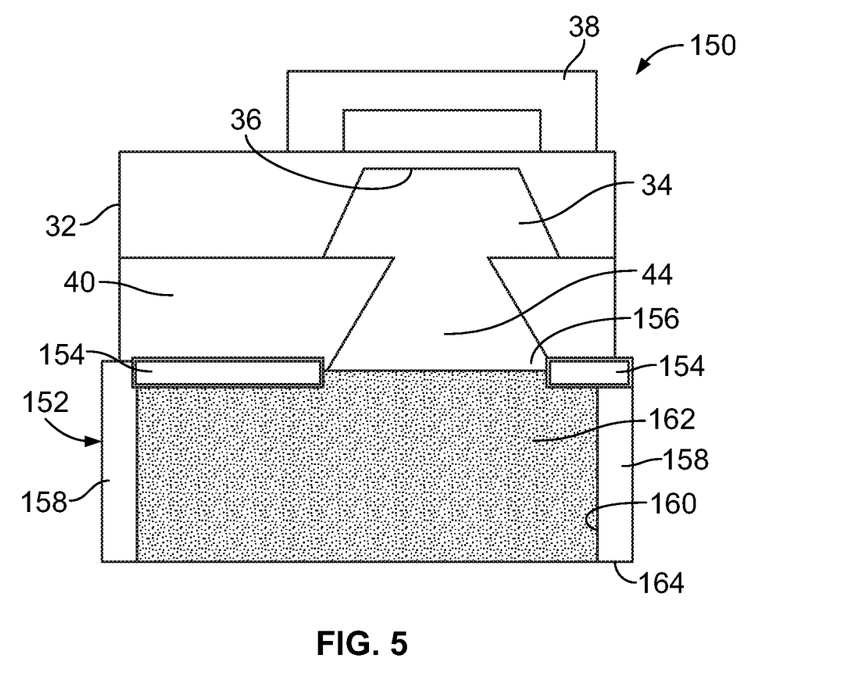
FIG. 5 is a cross-sectional side view of an example pressure sensor assembly as disclosed herein.

FIG. 5 illustrates an example pressure sensor assembly 150 as disclosed herein having a sensor body 32 with an internal cavity 34 and membrane 36, a top cover or support 38, and a support 40 similar to that described above and illustrated in FIG. 2. In this example, a substrate 152 is attached with the support 40. In this example, the substrate 152 comprises a substrate top member 154 that is attached to the support underside surface, and includes a passage 156 therethrough that is sized similar to the support opening 44. A substrate wall member 158 is attached to the substrate top member along an outer perimeter and extending downwardly therefrom, thereby providing an enlarged volume cavity or chamber 160 defined within the wall member that is in fluid flow communication with the substrate passage 156 and support opening 44. A porous material 162 is disposed within the cavity 160 that has various random or ordered channels disposed therein and permits fluid flow through the substrate from a base portion 164 to the support 40, though there may not be a single defined flow path. In an example, the porous material may be a ceramic material, however other materials having similar features and characteristics may be used. Alternatively, instead of using a single porous member to fill the substrate cavity, the cavity may be filled with a plurality of pieces that when combined together operate to form a porous composite that functions in a similar manner to provide multiple random or ordered fluid flow passages therethrough. In this example, the porous member disposed within the substrate cavity operates to mitigate a fluid pressure spike as the fluid passes through the substrate 152. While the use of a porous member or material has been described for this example, it is to be understood that the use of such porous member or material may be used with the other example pressure sensor assemblies as disclosed herein for the purpose of contributing to the desired effect of mitigating a fluid pressure spike before reaching the sensor membrane.

Figure 6:
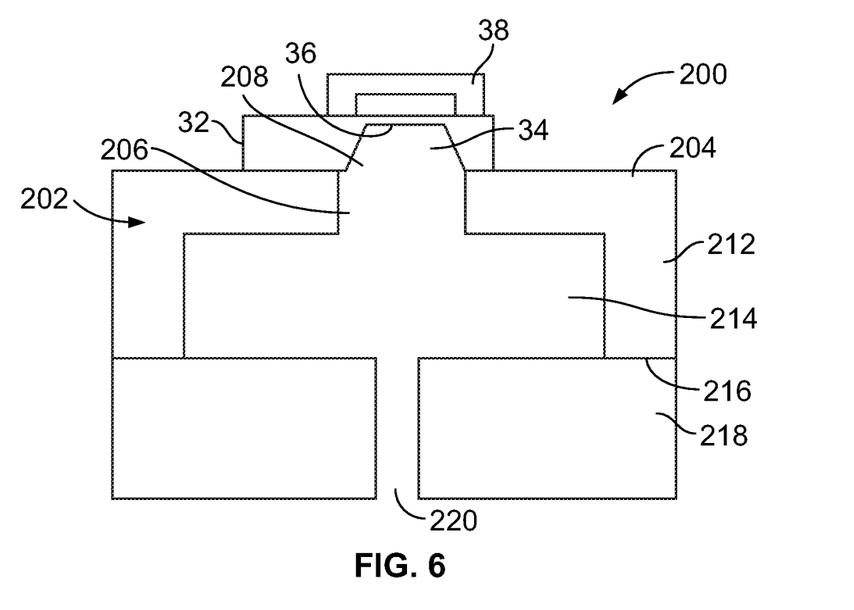
FIG. 6 is a cross-sectional side view of an example pressure sensor assembly as disclosed herein.

FIG. 6 illustrates an example pressure sensor assembly 200 as disclosed herein having a sensor body 32 with an internal cavity 34 and membrane 36 and a top cover or support 38. In this example, a support 202 is attached to the sensor body after wafer level processing, thereby enabling the use of a larger-sized support. In this example, the support is configured comprising a top section 204 having an opening 206 disposed therethrough that is aligned with and of similar diameter to the sensor body opening 208. The support top section is attached to an underside surface of the sensor body. The support includes a wall section 212 that extends downwardly from the top section and that defines an enlarged volume cavity or chamber 214 within the support 202. A feature of forming the support after wafer-level formation of the sensor body is that it enables use of a larger-scale support that can operate to provide a pressure spike mitigation function. The support wall section is attached along a base portion 216 to a substrate 218. In this example, the substrate 218 has a fluid inlet opening 220 that is reduced in size relative to the chamber 214 and that is positioned in alignment with the support opening 206, although the substrate opening 220 may be offset from the support opening if desired to contribute to the pressure spike mitigating function. The support may be attached to the sensor body, and the support may be attached to the substrate, by adhesive or other bonding material or technique as disclosed above that is known in the art. In an example, the substrate is formed from glass and the substrate is formed from a ceramic material to provide the desired thermal expansion buffering effect discussed above. In another example, the glass support may be bonded to the sensor body through the use of anodic bonding, thereby providing a desired bond therebetween without the use of adhesives of or the like. In such example, the ceramic substrate would be attached through the use of glass bonding as described above.

Figure 7:
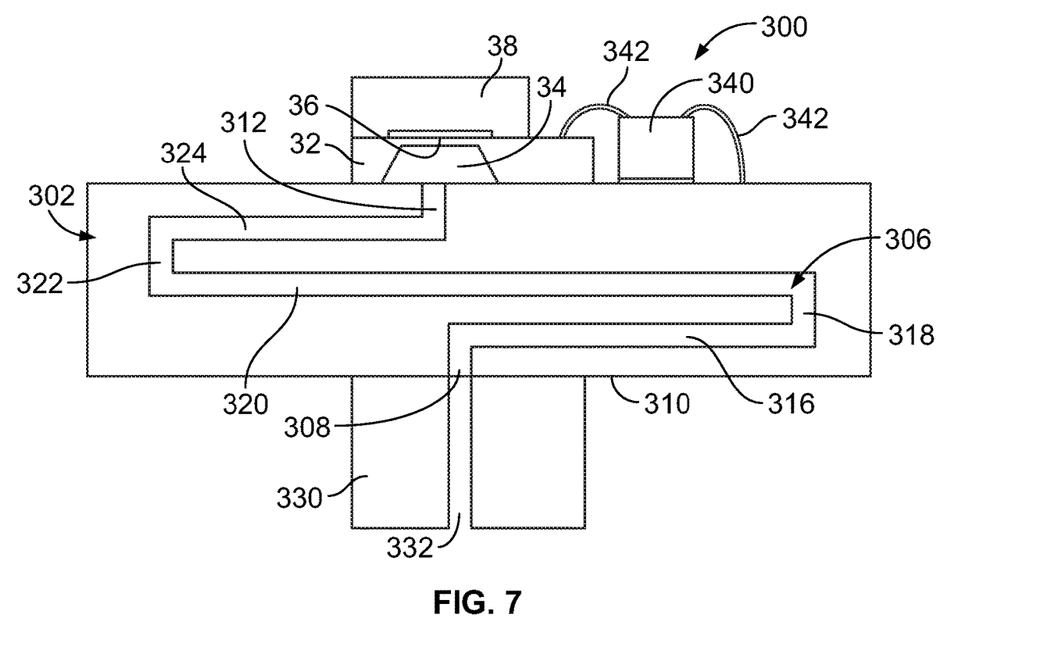
FIG. 7 is a cross-sectional side view of an example pressure sensor assembly as disclosed herein.

FIG. 7 illustrates an example pressure sensor assembly 300 as disclosed herein having a sensor body 32 with an internal cavity 34 and membrane 36 and a top cover or support 38. In this example, a substrate 302 is attached to an underside surface of the sensor body and is sized having an outside dimension considerably larger than the sensor body. In an example, the substrate has a thickness extending downwardly away from the body, and includes a multi-directional passage 306 therein that extends from an inlet opening 308 extending from a bottom surface 310 of the substrate to an outlet opening 312 on an opposite side of the substrate and in fluid flow communication with a sensor body opening. In an example, the substrate passage 306 includes five sections extending between the inlet and outlet openings 308 and 312. A passage first section 316 extends from and is oriented approximately 90 degrees relative to the inlet opening 308 horizontally within the substrate to passage second section 318 that is oriented approximately 90 degrees relative to the first section 316. A passage third section 320 extends from and is oriented approximately 90 degrees relative to the passage second section 318. A passage fourth section 322 extends from and is oriented approximately 90 degrees relative to the passage third section 320. A passage fifth section 324 extends from and is oriented approximately 90 degrees relative to the passage fourth section 322 and extends to the outlet opening 312 that is oriented approximately 90 degrees relative to the passage fifth section. Configured in this manner, the inlet opening 308, outlet opening 312, passage second section 318 and passage fourth section 322 are each oriented parallel with one another in the substrate, and the passage first section 316, passage third section 320, and passage fifth section 324 are each oriented parallel with each other in the substrate. While a particular example of how the passage within the substrate may be configured for the purposes of pressure spike mitigation, it is to be understood that other configurations of passage sections that operate to provide a pressure spike mitigation function are understood to be within the scope this disclosure.

In this example, the substrate 302 is attached to an external device 330 having a port 332 disposed therein for delivering an external fluid to the pressure sensor assembly for pressure measurement. In an example, the external device may be formed from a material that is different from the substrate material and that has a different coefficient of thermal expansion from that of the sensor body. Thus, it is desired that the substrate be formed from a material having a coefficient of thermal expansion that provides a transition in thermal expansion properties between that of the external device and the sensor body. In an example, the substrate may be formed from glass. If such is the case, then as with the example described above and illustrated in FIG. 7, the substrate may be bonded to the sensor body by anodic bonding. In the event that the substrate is formed from a ceramic material, then the substrate may be attached to the sensor body by bonding techniques discussed above. In an example, the substrate 302 may provide a surface that can be used for making an electrical connection with electrical sensing elements of the sensor body and/or may be used for placement of a pressure sensor electrical interface unit 340 disposed thereon by adhesive or other attachment method with the desired wire connections 342 useful for making electrical connections between the sensor body and/or another element such as a printed circuit board or the like.

Figure 8:
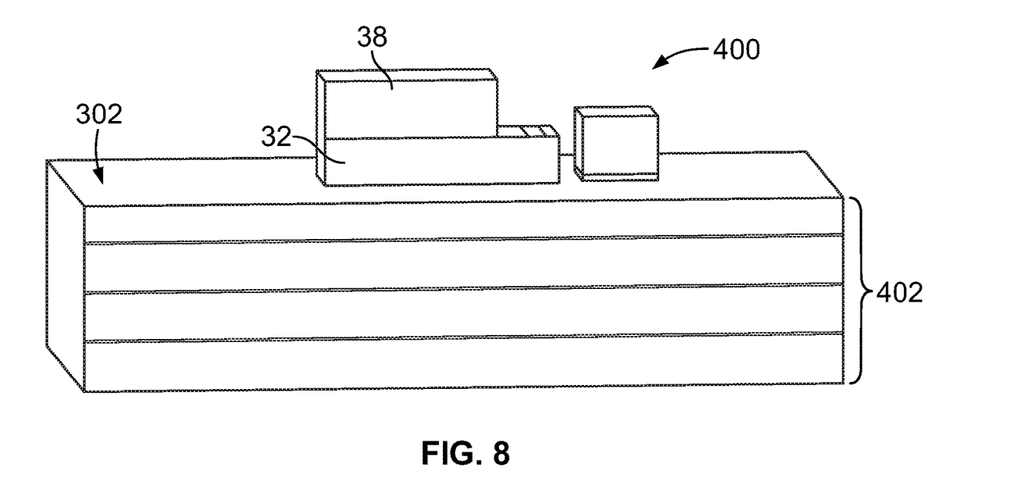
FIG. 8 is a perspective side view of the example pressure sensor assembly of FIG. 7.

FIG. 8 is a perspective view of the pressure sensor assembly 400 as described above and illustrated in FIG. 7, comprising the sensor body 32, a top cover or support 38 disposed thereon, wherein the sensor body is attached to the substrate 302. In this example, the substrate is shown as a laminate construction formed from a number of different layers 402. Such laminate construction is useful for the purpose of forming the passage within the substrate comprising the multiple sections, wherein the sections may be formed by etching each layer as needed to provide the desired passage configuration. Once the desired passage sections have been formed, the multiple layers are combined and are bonded together to provide the substrate.

Figure 9:
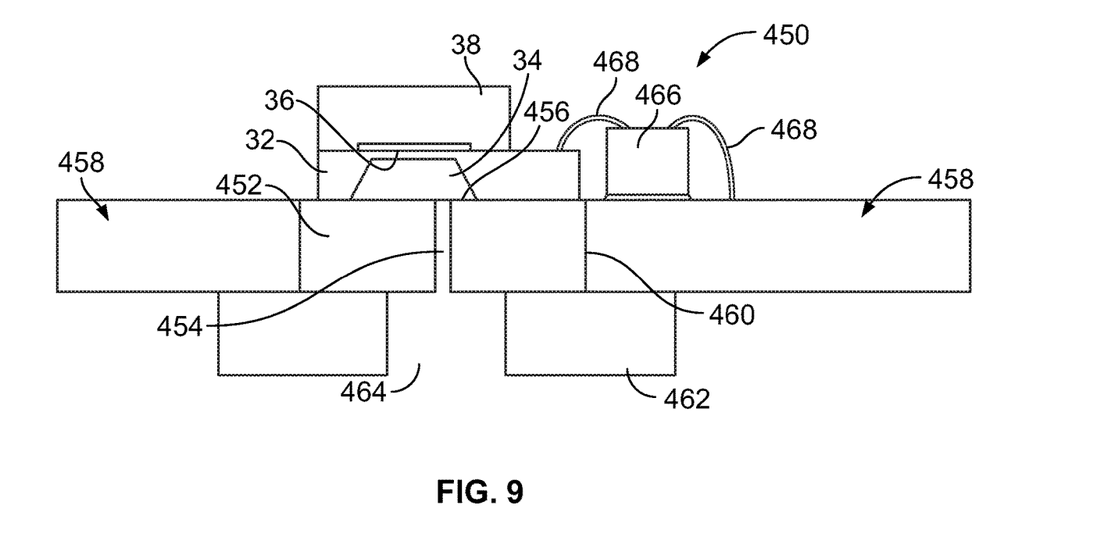
FIG. 9 is a cross-sectional side view of an example pressure sensor assembly as disclosed herein.

FIG. 9 illustrates an example pressure sensor assembly 450 as disclosed herein having a sensor body 32 with an internal cavity 34 and membrane 36 and a top cover or support 38. In this example, a substrate 452 is attached to an underside surface of the sensor body and is sized having a dimension somewhat similar to the sensor body. The substrate includes a passage 454 extending therethrough that has a diameter considerably smaller than that of the sensor body opening 456. In this example, the substrate is disposed within or attached with a printed circuit board 458. In this embodiment, the substrate is embedded within the printed circuit board such that the printed circuit board extends radially around a wall portion 460 of the substrate. The substrate is attached to an external device 462 having a port 464 disposed therein for delivering an external fluid to the pressure sensor assembly for pressure measurement. In this example, the external device port is sized having a diameter greater than that of the substrate passage, and both the substrate and a portion of the printed circuit board are attached to the external device. In this example, the printed circuit board 458 provides a surface that can be used for making an electrical connection with electrical sensing elements of the sensor body and/or may be used for placement of a pressure sensor electrical interface unit 466 disposed thereon by adhesive or other attachment method with the desired wire connections 468 useful for making electrical connections between the sensor body and the printed circuit board.

While certain types and constructions of pressure sensor assemblies have been disclosed and illustrated, it is to be understood that such examples have been provided for purposes of reference and illustration, and that pressure sensor assemblies as disclosed herein should not be limited to the particular embodiments discussed above. Thus, pressure sensor assembly embodiments other than those discussed and illustrated comprising the integral pressure mitigation elements and features as disclosed herein are understood to be within the scope of this description. For example, it is understood that all types of MEMS pressure sensor assemblies comprising diaphragms or membranes exposed to gas or fluid pressure being measured comprising such integral fluid pressure mitigation elements and features are intended to be within the scope of pressure sensor assemblies as disclosed herein and as defined by the following claims.

What is claimed is:

1. A pressure sensor assembly comprising:
    a sensor body comprising a sensing membrane disposed within the body for placing a fluid from an external source in communication with the membrane and determining a pressure of the fluid;
    a support connected with the body and comprising a channel extending therethrough for receiving the fluid, wherein the channel is in fluid-flow communication with the membrane;
    a substrate connected with the support and comprising a channel extending therethrough for receiving the fluid from an external source, wherein the fluid is transmitted through the substrate to the support;
    wherein one of the substrate or the support channels comprises a pressure mitigation feature disposed therein for mitigating the transmission of pressure spikes in the fluid from the external source to the sensor membrane.

2. The pressure sensor assembly as recited in claim 1 wherein the substrate is formed from a material having a coefficient of thermal expansion that is between a coefficient of thermal expansion of the support and a coefficient of thermal expansion of an external fluid source.

3. The pressure sensor assembly as recited in claim 1 wherein the sensor body is formed from silicon, and the substrate is formed from a ceramic material.

4. The pressure sensor assembly as recited in claim 1 wherein the substrate comprises a number of ceramic elements that are bonded together to form the pressure mitigation feature.

5. The pressure sensor assembly as recited in claim 1 wherein the pressure mitigation feature comprises a one of a substrate channel or support channel enlarged volume section.

6. The pressure sensor assembly as recited in claim 1 wherein the pressure mitigation feature comprises a movable member disposed within one of the support channel and the substrate channel.

7. The pressure sensor assembly as recited in claim 1 wherein the pressure mitigation feature comprises a porous member disposed within one of the support channel and the substrate channel.

8. The pressure sensor assembly as recited in claim 1 wherein the pressure mitigation feature comprises two or more changes of direction of one of the support channel and the substrate channel as it moves through the respective support or substrate.

9. The pressure sensor assembly as recited in claim 1 further comprising a printed circuit board connected with the substrate.

10. A pressure sensor assembly comprising:
    a sensor body comprising a sensing membrane and an open cavity in the body adjacent the membrane for enabling a fluid from an external source to contact the membrane for determining a pressure of the fluid;
    a substrate connected with the body and comprising a channel extending therethrough for receiving a fluid from an external source and transmitting the fluid through the substrate to the body; and
    a fluid pressure mitigation feature disposed within the pressure sensor assembly for mitigating the transmission of pressure spikes upstream of the membrane of a fluid entering the pressure sensor assembly.

11. The pressure sensor assembly as recited in claim 10 wherein the fluid pressure mitigation feature is disposed within the substrate and is selected from one or more of an enlarged volume section of the channel, two or more changes of direction in the channel, a porous member disposed within the channel, and a movable element within the channel.

12. The pressure sensor assembly as recited in claim 10 wherein the sensor body is formed from silicon and the substrate is formed from a material having a coefficient of thermal expansion that is between a coefficient of thermal expansion of the sensor body and a coefficient of thermal expansion of an external fluid pressure source.

13. The pressure sensor assembly as recited in claim 10 wherein the substrate is formed from a ceramic material.

14. The pressure sensor assembly as recited in claim 10 further comprising a support interposed between the sensor body and the substrate, wherein the support includes a channel extending therethrough and in communication with the support channel and body open cavity.

15. The pressure sensor assembly as recited in claim 14 wherein the fluid pressure mitigation feature is disposed within the support.

16. The pressure sensor assembly as recited in claim 14 wherein the sensor body and the support comprises a MEMS sensor.

17. A method for mitigating a pressure spike of an external fluid being monitored by a pressure sensor assembly comprising the steps of:
  directing a fluid into a substrate having a channel extending therethrough;
  transferring the fluid from the substrate to a sensor body that is connected thereto, the sensor body comprising an open cavity and a membrane at the end of the cavity, wherein the membrane is configured to monitor a pressure of a fluid that is disposed thereon;
  mitigating a pressure spike in the fluid by directing the fluid entering the pressure sensor assembly through a pressure mitigation feature that is disposed therein and positioned upstream from the membrane.

18. The method as recited in claim 17 wherein the step of mitigating comprises one or more of directing the fluid through a channel of the assembly comprising two or more direction changes, directing the fluid into an enlarged volume section in the assembly upstream from the sensor body, directing the fluid into contact with a movable element disposed within a channel of the assembly, and directing the fluid into contact with a porous element disposed within a channel of the assembly.

19. The method as recited in claim 17 wherein the step of mitigating takes place in the substrate.

20. The method as recited in claim 17 wherein the pressure sensor assembly comprises a support that is interposed between the substrate and the sensor body and that includes a channel extending therethrough and, wherein during the step of transferring, fluid is transferred from the substrate and through the support channel to the sensor body.

* * * * *